United States Patent [19]

Piepho

[11] Patent Number: 5,179,707
[45] Date of Patent: Jan. 12, 1993

[54] INTERRUPT PROCESSING ALLOCATION IN A MULTIPROCESSOR SYSTEM

[75] Inventor: Richard S. Piepho, Naperville, Ill.

[73] Assignee: AT&T Bell Laboratories, Murray Hill, N.J.

[21] Appl. No.: 533,192

[22] Filed: Jun. 1, 1990

[51] Int. Cl.[5] .......................................... G06F 13/26
[52] U.S. Cl. ........................ 395/725; 364/DIG. 1; 364/230.2; 364/241.4; 364/280.8; 364/281; 364/281.8; 364/DIG. 2; 364/941.6
[58] Field of Search .......... 364/200, DIG. 1, DIG. 2, 364/242.7, 241.4, 241.6, 281, 280.8, 281.6, 281.8, 941, 941.4, 941.6, 941.91, 230.2, 230.3, 240.4; 395/725, 325

[56] References Cited

U.S. PATENT DOCUMENTS

| | | | |
|---|---|---|---|
| 4,080,649 | 3/1978 | Calle | 364/200 |
| 4,816,990 | 3/1989 | Williams | 364/200 |
| 5,067,071 | 11/1991 | Schanin et al. | 395/275 |

FOREIGN PATENT DOCUMENTS 0348076  6/1989  European Pat. Off. .

OTHER PUBLICATIONS

B. Beck et al., "VLSI Assist for a Multiprocessor", *Proceedings Second International Conference on Architectural Support for Programming Languages and Operating Systems* (ASPLOS II), Palo Alto, Calif., Oct. 5-8, 1987, pp. 10-20.

A. Cantoni, "A Technique for Interrupt Distribution in a Multiprocessor System", *Software & Microsystems*, vol. 1, No. 6, Oct. 1982, pp. 153-160.

*Primary Examiner*—Michael R. Fleming
*Assistant Examiner*—Clifford Knoll
*Attorney, Agent, or Firm*—Werner Ulrich

[57] ABSTRACT

This invention relates to an arrangement for distributing interrupts within a multiprocessing system and for processing personal computer (PC) interrupts as well as multiprocessor interrupts in that system. New interrupts are diverted from processors that have recently processed an interrupt, thus preventing any one processor from being overloaded with an interrupt processing work load. Some of the processors are equipped to process PC interrupts and multiprocessing system interrupts. In each processor classes of interrupts may be masked out. A distributed arbitrator is used to allocate an interrupt among a plurality of processors available to process the interrupt.

14 Claims, 2 Drawing Sheets

INTERRUPT PROCESSING ALLOCATION IN A MULTIPROCESSOR SYSTEM

TECHNICAL FIELD

This invention relates to apparatus for processing interrupts in a shared memory multiprocessing system.

PROBLEM

A common way of achieving high throughput in processor systems, and more specifically for achieving the advantages of steady modular growth of capacity for such systems, is to use a multiprocessor system having a plurality of similar or identical processors, each of which can access a common memory. The processors of such systems typically perform both background tasks, i.e., tasks typically requiring a longer period of time for their completion, and interrupt tasks, i.e., tasks which are performed in response to specific interrupt signals and which must be performed almost immediately after an interrupt signal is received. The interrupt signal typically is generated by an input/output device such as a disk or tape unit and requires some immediate processing. In such a system where there may be a large number of separate sources of these interrupt signals, it is necessary to allocate the processing of each new interrupt to one of the processors of the multiprocessor system. In one prior art arrangement, all interrupts go to one processor. This arrangement is limited in the size of the system that can be supported because all of the interrupt processing is necessarily funneled to a common processor which must handle not only the average interrupt processing load, but also must handle clustered interrupt processing.

Some of these difficulties are overcome by a second arrangement wherein all interrupts are initially channeled to a single processor but wherein this processor in turn interrupts one of the other processors to handle each specific interrupt. The disadvantage of this approach is that the response time is necessarily slowed down because the initial processor's time is added to that of the processor that actually handles the interrupt. Further, this arrangement is wasteful of resources because the initial processor's resources which are dedicated in part or in whole to the initial processing of these interrupts cannot be used for other purposes. Further, if interrupts are clustered, these clustered interrupts are backed up in the initial processor and so the delay in processing the last of the clustered interrupts may be unacceptable. In an alternate arrangement, interrupts are placed on either a dedicated interrupt bus or a multiprocessor system memory bus. The interrupt source wait for an idle interval on either of these buses and upon the detection of this idle interval place a signal identifying the interrupt source. This interrupt is then passed by each of the processors of the multiprocessor system and through some arbitration scheme, one of the processors picks up the interrupt. The specific processor that carries out the interrupt processing is selected either by having all the processors pick up the interrupt signal and through some arbitration arrangement automatically selecting among themselves the particular processor which will handle the interrupt or by having the interrupt signal sequentially pass each processor wherein each processor either picks up the interrupt signal and prevents the signal from being passed to other processors or does not pick up the interrupt signal and permits the signal to pass to the other processors, one of whom will pick it up.

In many of these multiprocessor systems, the interrupts are clustered so that each interrupt signal in fact represents a plurality of sources. For example, one interrupt signal may represent interrupts generated by three or four tape units. Therefore, each interrupt signal in fact represents a plurality of basic interrupt sources. A problem, even with the last of these arrangements, is that it is very difficult to arrange that the work of processing the interrupts is evenly distributed. For example, if an interrupt bus is used that is connected to each of the processors in sequence, and each processor makes the decision on whether or not to accept an interrupt based on the level of the interrupt, the first of the processors may be either overloaded or underloaded because of changes in the rate of interrupts at different levels and because of the inability to predict adequately the portion of the interrupts that will be, in fact, associated with each level. A problem of the prior art therefore is that there is no satisfactory arrangement for distributing interrupts among a plurality of processors in a shared memory multiprocessor system such that each processor performs an approximately "fair" share of the interrupt processing load, that interrupts are processed expeditiously and efficiently.

A large body of programs exists which have been written for personal computers (PCs) and which have been written to interface with standard software and hardware interrupt drivers that work with such PCs. The industry standard for PC interrupt hardware (controlled by software and interrupt drivers) is specified in the Extended Industry Standard Architecture (EISA) Specification, Version 3.1 (1989) published by BCPR Services, Inc. Such drivers are used, for example, for controlling the video displays of PC terminals; one example of such a program is a typical PC console driver. The PC interrupt signals of this class must be routed to a particular processor and to a particular set of register locations within that processor. The types of interrupt drivers used in multiprocessor systems are not compatible with PC interrupt drivers. A problem of the prior art is that no arrangement exists for both fairly distributing interrupts among processors of a multiprocessor system having shared memory and distributing a subset of these interrupts to particular preselected processors (acting as PC processors) and to transmit this subset of interrupts in arrangements compatible with PC hardware and software.

SOLUTION

The above problem is solved and an advance is made over the prior art in accordance with the principles of my invention wherein, in one exemplary embodiment, interrupts are distributed among a plurality of processors of a shared memory multiprocessor system; within that plurality, the available processor with the highest rank, as modified by a prefix representing the recent interrupt processing history of a processor, is selected by an arbitration arrangement to process the interrupt.

In one embodiment of the invention, each multiprocessor interrupt signal is distributed to all the processors and an arbitration scheme is used to select the processor that will actually handle the interrupt; each processor has a processor rank identification and the available processor with the highest rank identification is selected for processing the interrupt. In accordance with the invention, the rank identification of the processor is modified by an additional indication which effectively prefixes the processor rank identification, the indication being representative of the time that has elapsed since the last interrupt was processed and/or the processing load of that interrupt. In one specific embodiment, the indication is simply one bit which is reset for a prespecified time after any interrupt has been processed.

In one specific embodiment, the arbitration is based on transmitting signals among the processors in such a way that signals from lower ranked processors are overridden by signals from higher ranked processors. The designation of a processor is built into the backplane wiring such that the position of the processor at the position in the backplane where a processor is plugged in defines the rank of the processor. The circuitry used for accepting interrupt signals from the distribution bus comprises interrupt distribution logic which comprises logic for recognizing that an active signal of a type which the processor is required to handle if the processor is the highest ranking processor for that kind of signal and for performing the arbitration and for accepting additional information on the interrupt distribution medium defining the data of the interrupt. An interrupt register is attached to the interrupt distribution logic to accept the signal representing the rank of the interrupt. This rank is logically combined with the contents of an interrupt mask register used within the processor to select the levels of interrupt that the processor will process. If the interrupt signal is of a level which passes through the mask then this processor can bid for serving the interrupt and the arbitration logic determines which of the bidding processors will actually process the interrupt. In the arbitration arrangement, a bidding signal from a higher ranking processor suppresses the bidding signal of any lower ranking processor.

In this embodiment, some of the processors of the shared memory multiprocessor system are arranged to receive PC compatible input including interrupt signals and to transmit PC compatible output and also to receive and transmit interrupt signals and other I/O signals of the multiprocessing system. In accordance with one specific embodiment of the invention, each of the processors of the system receives multiprocessor I/O interrupt signals. The received multiprocessor I/O interrupt signals are distributed among all the processors by an interrupt distribution medium and PC compatible interrupt signals are distributed among some of the processors. Each processor comprises internal arbitration logic to select which processor will process any given interrupt. In this embodiment the arbitration scheme is based on each processor having a rank different from the rank of all other processors wherein the rank is prefaced by an indication of preference for accepting interrupts based on the previous interrupt processing history. The processor with the highest rank, as modified by this indication, then processes the interrupt.

In accordance with one aspect of the invention, the PC compatible mode can be used to drive and receive input from a network interface to a network connectable to a plurality of PC's. Advantageously, this arrangement permits PC compatible uniprocessor interface software to be used for communicating between uniprocessors at the other terminals of the network and a multiprocessor system.

Advantageously, this invention permits existing PC compatible software that meets the protocols of connected processor or communication system to be used for interfacing to a multiprocessor system wherein the multiprocessor system uses a different protocol, for improved performance, to communicate within the multiprocessor system and with other devices.

DETAILED DESCRIPTION

Figure 1:
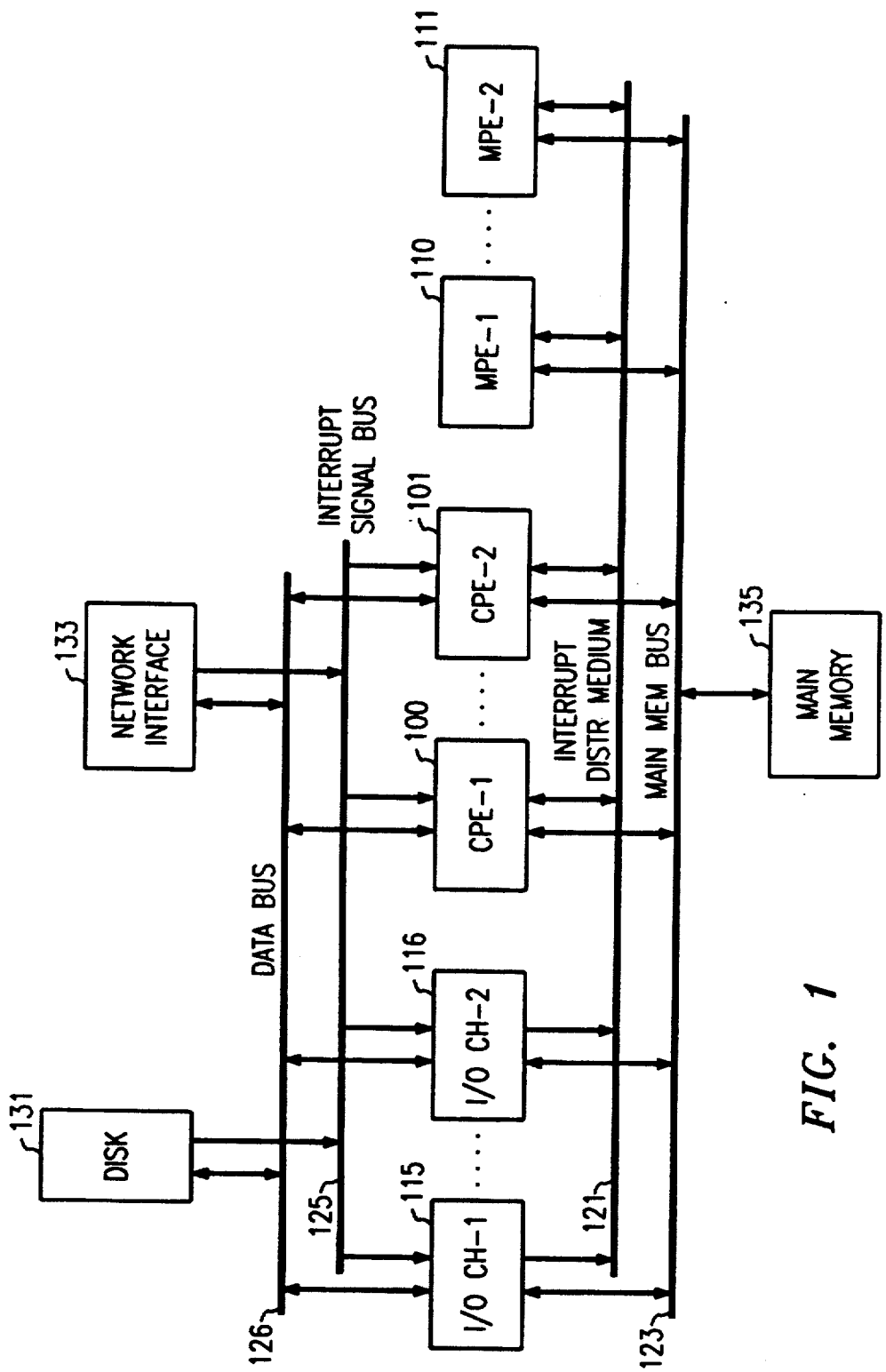
FIG. 1 is a block diagram of a multiprocessing system for practicing applicant's invention.

FIG. 1 is a block diagram of a multiprocessor system. It includes compatible processor element 1 (block 100), . . . , compatible processing element-2 (block 101). These are processing elements, shown in detail in FIG. 2, for interfacing with input/output (I/O) equipment in a manner compatible with standard personal computer hardware and software standards. Also shown are input/output channel 1 (block 115), . . . , input/output channel 2 (block 116) for taking signals from the multiprocessor compatible input/output equipment and communicating with the main memory bus 123 and interrupt signal distribution medium (block 121). There are further multiprocessing elements MPE-1 (block 110), . . . , MPE-2 (block 111). Note that while CPE-1 in connected to both the interrupt signal bus 125 and the interrupt distribution medium 121, MPE-1 is only connected to the interrupt distribution medium 121. This is because whereas CPE-1 is capable of communicating with units such as the network interface 133 which operates only in the PC standard I/O mode, and with I/O devices such as disk 131 which is arranged to operate in the multiprocessor mode by signaling its interrupt signals over the interrupt distribution medium 121 MPE-1 only receives interrupt signals from IDM 121.

Each of the I/O channels 115, . . . , 116 accepts one or more of the I/O control signals from I/O signal bus 125 and uses them to generate a signal that is placed on IDM 121. In addition, I/O channels 115, . . . , 116 are used to communicate data between a peripheral device and the main memory bus 123. The main memory bus 123 is connected to both the CPE elements 100, . . . , 101 and MP elements 110, . . . , 111, all of which communicate with shared main memory 135 via the main memory bus 123. Multiprocessor I/O elements communicate with memory as follows: if CPE-1 wishes to access disk 131, for example, CPE-1 writes a request in main memory 135, including the address of memory where the disk output is to be written. CPE-1 then writes a request indication into a known location of a controller of disk 131 via data bus 126. The disk controller then reads main memory 135, via data bus 126, I/O channel-1 (115), and memory bus 123 to obtain addressing and data transfer length information. Disk 131 then accesses the requested data and delivers that data to main memory via data bus 126, I/O channel-1 (115) and main When the disk action is completed, the disk sends an interrupt signal over interrupt signal bus 125 to I/O channel 1, which then sends an interrupt signal over IDM 121 to notify the multiprocessor system that the disk action has been completed. Interrupt signal bus 125 comprises a bundle of wires carrying interrupt signals from sources to those processors and/or channels which are attached to particular ones of the interrupt signals. If PC compatible network interface 133 wishes to transmit one or more characters, it interrupts an attached compatible processing element, in this case, CPE-1 (block 100) over interrupt signal bus 125. CPE-1 then accepts the data from network interface 133 and controls the storage of that data in main memory using connections from CPE-1 to the main memory bus 123 for storage in main memory 135. Data from network interface 133 is transmitted to main memory 135 via data bus 126, CPE-1, and main memory bus 135. CPE-1 sends data to network interface 133 by first writing a request into a known location of interface 133 via data bus 126. Subsequently, data is sent from CPE-1 to interface 133 over data bus 126.

In one alternative mode, CPE-1 has a direct memory access unit for directly controlling the transmission of data from the network interface 133 via the data bus 126 to memory bus 123. In another alternative mode, the network interface 133 has a direct memory access unit for controlling transfer of data between the memory and the interface, and uses CPE-1 as an access means for accessing the memory bus 123.

Figure 2:
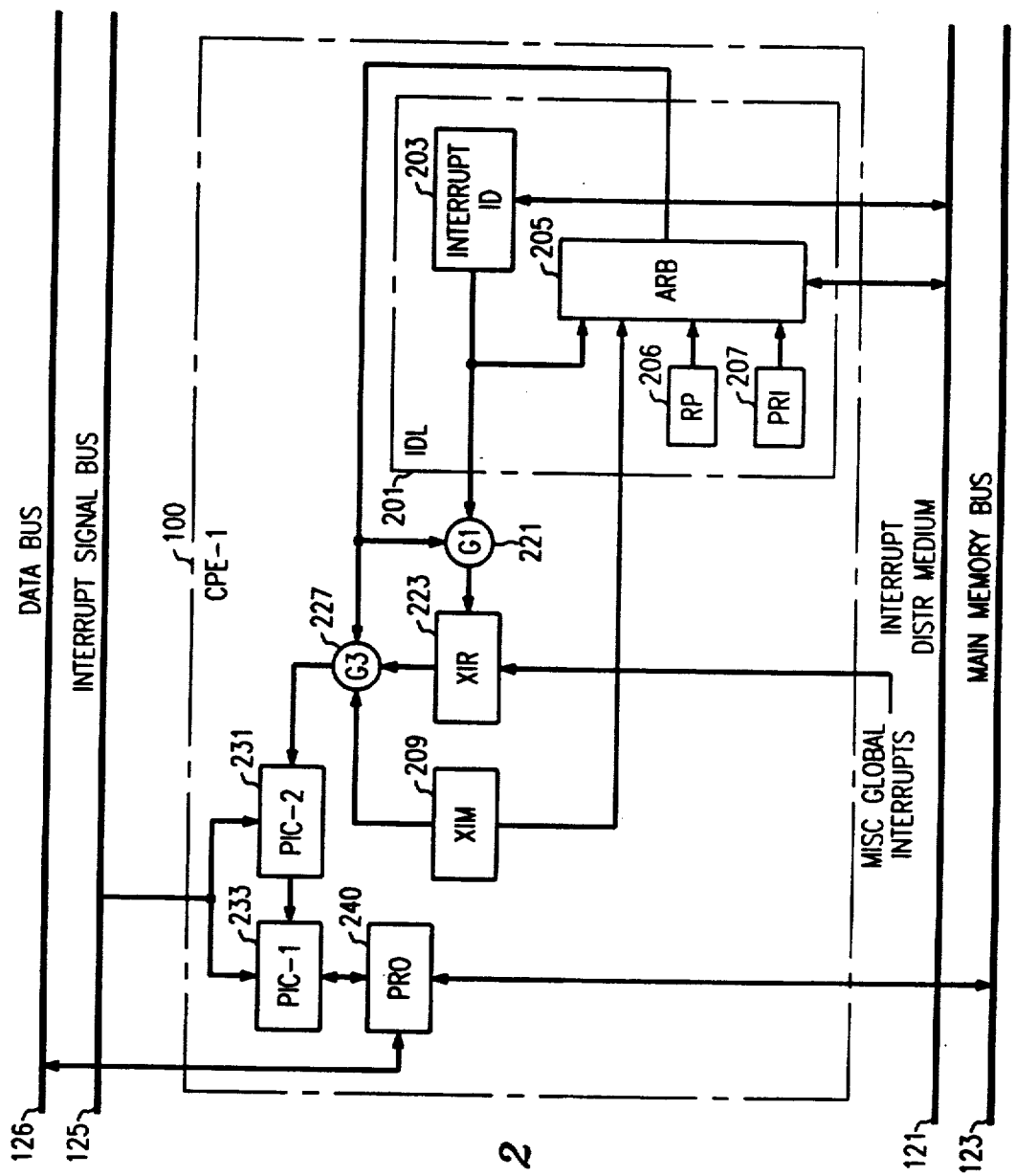
FIG. 2 is a block diagram of the interrupt handling mechanism within one of the processors of the multiprocessing system.

FIG. 2 shows details of CPE-1 (block 100). Note that CPE-1 receives interrupt source signals on the top from interrupt signal bus 125, carrying a signal from PC compatible network interface 133 and on the bottom from multiprocessor system interrupt distribution medium 121. Consider first the signals received from the interrupt distribution medium. These signals go into interrupt distribution logic 201 and specifically are terminated within block 201 in an interrupt identifier register 203. The output of this register is connected to an arbitration (ARB) block 205 whose other inputs include an interrupt level mask register 209, a rank prefix 206, processor rank identifier 207 and interrupt distribution medium 121 which also carries signals from the output of ARB blocks 205 in other processing elements. The rank prefix 206 represents a modifier to the processor rank identifier 207, the rank being determined within the identifier by the position of the processor plugged into a backplane for interconnecting the processor elements. The rank prefix in this embodiment is set to 0 after processing of an interrupt has begun, and is set to 1 after a lapse of 100 microseconds following processing of the interrupt. If the CPE-1 is an available candidate for processing an interrupt received from medium 121, ARB 205 transmit a serial signal representing the modified rank of CPE-1. While transmitting this rank, CPE-1 also monitors medium 121. If CPE-1 transmits a "0" and monitors a "1", this is a signal that a processor element of higher modified rank is an available candidate, and that CPE-1 will therefore not process this interrupt. Otherwise, CPE-1 will process the interrupt; in that case, the output of ARB 205 is active.

If the output of ARB 205 is active, then a coded version of the level of the interrupt is gated by gate G1 (block 221) and stored in interrupt level register (XIR) 223. XIR 223 stores the interrupt level as a 1 out of 16 signal. This makes it easy to combine the output of XIR 223 with that of XIM 209 in gate G3 (block 227) to ensure that the level of the interrupt is still within the range that the processor can handle. XIM is then altered under software control to filter out subsequent interrupt signals at the level of the present interrupt signal at the same or lower levels as the present interrupt signal. The output of G3 is a single bit which enters a register in peripheral interrupt control-2 (PIC-2) (block 231). The signal enters PIC-2 at a position which identifies interrupt signals received from the interrupt distribution medium 121. Interrupt source signals which are directly received by CPE-1 are gated into one of the other positions of PIC-1 (block 233) or PIC-2 (block 231). PIC-1 also receives inputs from internal interrupt sources within CPE-1. If any of the interrupt signal indicators of PIC-2 are high, then the output of PIC-2 is placed into a prearranged position of PIC-1. Processor 240 then examines the state of PIC-1 and PIC-2 if any of the interrupt indicators of PIC-1 are high. If appropriate, as indicated by an active signal in the appropriate bit position of PIC-2, the processor than examines the contents of XIR 223 and decides which interrupt to process based on the contents of PIC-1, PIC-2 and XIR 223. Processor 240 then communicates as appropriate with main memory bus 123.

MPE-1 (block 110) is similar to CPE-1 except that the connections to the interrupt source signals shown at the top of block 100 are missing; consequently, MPE-1 only handles interrupts which have been gated from G3 (block 227).

Using this arrangement, communications with the network interface 133 can be carried out entirely in a PC compatible mode so that if software had been previously been arranged to process such communications using PC compatible mode networking software, there would be no need to write such software. On the other hand the multiprocessor system is capable of communicating with disk 131 in a conventional multiprocessor mode using software for controlling such communications.

In this particular embodiment, 11 outputs from interrupt signal source bus 125 are terminated in CPE-1. Each of the PIC units 231 and 233 can accept 7 input signals, therefore 6 of the interrupt source signals can be terminated in PIC-1 (block 233) and 5 can be terminated in PIC-2 (block 231). This allows the output of PIC-2 to be used for setting the seventh input of PIC-1 and allows the output of G3 to be used for setting the sixth or seventh input to PIC-2.

In other embodiments of the invention, the rank prefix is a counter whose initial value is set by software according to the processing load of the interrupt, and which is automatically incremented at a predetermined rate, such as once every millisecond. Advantageously, this arrangement permits a processor that has processed a complex interrupt to wait, on the average, a longer time before processing the next interrupt.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. In a multiprocessor system comprising:
   a plurality of processors for processing data;
   main memory means accessible by each of said processors; and
   interrupt distribution means for distributing multiprocessor interrupt signals to each of said plurality of processors;
   the invention comprising:
   said multiprocessor system comprises arbitration means distributed among said processors for distributing interrupt load among said processors, said arbitration means responsive, for allocating a processing of an interrupt, to an availability signal for each processor and to a first signal for each processor indicating a rank of said each processor and a second signal for each processor indicating interrupt processing history of said each processor, said first and second signals being combined to form a modified rank for each processor, the processor with a most extreme modified rank in a predetermined direction being used to process said interrupt.

2. The system of claim 1 wherein said first signal indicating a rank of each processor is defined by a position of said processor in a backplane for interconnecting said processors.

3. The system of claim 1 wherein said second signal represents time elaspsed since a most recent interrupt was processed by said each processor, wherein said second signal is used as a more significant prefix to said first signal.

4. The system of claim 1 wherein a value of said second signal for said each processor represents a function of a most recently processed interrupt as modified by a lapse of time since processing of said most recently processed interrupt by said each processor.

5. The system of claim 1 wherein said multiprocessor interrupt signals are included in a plurality of classes of signals, and wherein each of said processors comprises means for modifying its availability signal by masking out ones of said plurality of classes whereby processors whose mask means are in a state to mask out ones of said classes of interrupt signals are not availble for processing interrupt signals of said ones of said plurality of said classes.

6. In a multiprocessor system comprising:
a plurality of processors for processing data;
main memory means accessible by each of said processors; and
primary interrupt distribution means for distributing multiprocessor interrupt signals from and to each of said plurality of processors;
the invention comprising:
said system further comprises means for distributing personal computer (PC) compatible interrupt signals generated externally to ones of said processors; and
each of said ones of said processors comprising means for responding to said PC compatible interrupt signals and for responding to multiprocessor interrupt signals from said primary interrupt distribution means, for allocating a processing of an interrupt.

7. In a multiprocessor system comprising:
a plurality of processors for processing data;
main memory means accessible by each of said processors; and
primary interrupt distribution means for distributing multiprocessor interrupt signals from and to each of said plurality of processors;
the invention comprising:
said system further comprises means for distributing personal computer (PC) compatible interrupt signals generated externally to ones of said processors; and
each of said ones of said processors comprising means for responding to said PC compatible interrupt signals and for responding to multiprocessor interrupt signals from said primary interrupt distribution means, for allocating a processing of an interrupt;
the system further comprising arbitration means distributed among said processors for distributing interrupt load among said processors, said arbitration means responsive, for allocating a processing of an interrupt, to an availability signal and to a first signal indicating a rank of each processor and a second signal indicating interrupt processing history of each processor, said first and second signals being combined to form a modified rank for each processor, the processor with a most extreme modified rank in a predetermined direction being used to process said interrupt.

8. The system of claim 7 wherein said first signal indicating a rank of each processor is defined by a position of said each processor in a backplane for interconnecting said processors.

9. The system of claim 7 wherein said second signal for each processor represents time elapsed since a most recent interrupt was processed by said each processor, wherein said second signal for each processor is used as a more significant prefix to said first signal for each processor.

10. The system of claim 7 wherein a value of said second signal for each processor represents a function of a most recently processed interrupt by said each processor as modified by a lapse of time since processing of said most recently processed interrupt by said each processor.

11. The system of claim 6 wherein said multiprocessor interrupt signals and said PC compatible interrupt signals are included in a plurality of classes of signals, and wherein each of said processors comprises means for masking out ones of said plurality of classes whereby processors whose mask means are in a state to mask out ones of said classes of interrupt signals are not available for processing interrupt signals of said ones of said plurality of said classes.

12. The system of claim 6 wherein one of said PC compatible interrupt signals is receivable from a network interface to a network connectable to a plurality of PCs whereby PC compatible uniprocessor interface software is used in said multiprocessor system for communicating between uniprocessor PCs or other processors connectable to said network interface and said multiprocessor system.

13. In a multiprocessor system comprising:
a plurality of processors for processing data;
main memory means accessible by each of said processors; and
distribution means for distributing multiprocessor interrupt signals to each of said plurality of processors;
the invention comprising:
means for distributing personal computer (PC) compatible interrupt signals generated externally to ones of said plurality of processors, said ones of said processors comprising means for responding to said PC compatible interrupt signals and for responding to multiprocessor interrupt signals from said interrupt distribution means;
arbitration means distributed among said processors for distributing interrupt load among said processors, said arbitration means responsive, for allocating a processing of an interrupt, to an availability signal for each processor and to a first signal for each processor indicating a rank of said each processor and a second signal for each processor indicating interrupt processing history of said each processor, said first and second signals being combined to form a modified rank for each processor, the processor with a most extreme modified rank in a predetermined direction being used to process said interrupt, wherein said second signal for each processor represents time elapsed since a most recent interrupt was processed in said each processor, wherein said second signal is used as a more significant prefix to said first signal, wherein said first signal indicating a rank of each processor is defined by a position of said processor in a backplane for interconnecting said processors;

wherein said multiprocessor interrupt signals and said PC compatible interrupt signals are included in a plurality of classes of signals, and wherein each of said processors comprises means for modifying its availability signal by masking out ones of said plurality of classes whereby processors whose mask means are in a state to mask out ones of said classes of interrupt signals are not available for processing interrupt signals of said ones of said plurality of said classes.

14. The system of claim 13 wherein one of said PC compatible interrupt signals is receivable from a network interface to a network connectable to a plurality of PCs whereby PC compatible uniprocessor interface software may be used for communicating between uniprocessor PCs and said multiprocessor system.

* * * * *